United States Patent
Kanemaru

(10) Patent No.: US 10,331,108 B2
(45) Date of Patent: Jun. 25, 2019

(54) NUMERICAL CONTROLLER OPERATING FROM TABLE-FORMAT DATA

(71) Applicant: FANUC Corporation, Minamitsuru-gun, Yamanashi (JP)

(72) Inventor: Akira Kanemaru, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 310 days.

(21) Appl. No.: 14/921,047

(22) Filed: Oct. 23, 2015

(65) Prior Publication Data

US 2016/0116902 A1 Apr. 28, 2016

(30) Foreign Application Priority Data

Oct. 27, 2014 (JP) .................................. 2014-218046

(51) Int. Cl.
  *G05B 19/18* (2006.01)
  *G05B 19/408* (2006.01)

(52) U.S. Cl.
  CPC .. *G05B 19/408* (2013.01); *G05B 2219/32173* (2013.01); *Y02P 90/10* (2015.11)

(58) Field of Classification Search
  CPC ........ G05B 19/408; G05B 2219/32173; Y02P 90/10
  See application file for complete search history.

(56) References Cited

U.S. PATENT DOCUMENTS

| 4,692,856 A | | 9/1987 | Komiya | |
|---|---|---|---|---|
| 5,287,031 A | * | 2/1994 | Akiba | ..................... F16C 29/00 310/12.19 |
| 5,400,260 A | * | 3/1995 | Matsumura | ...... G05B 19/40937 318/568.1 |
| 5,492,440 A | * | 2/1996 | Spaan | .................. G05B 19/404 318/569 |

(Continued)

FOREIGN PATENT DOCUMENTS

| JP | S59-177604 A | 10/1984 |
|---|---|---|
| JP | H08-137537 A | 5/1996 |

(Continued)

OTHER PUBLICATIONS

Notification of Reasons for Refusal dated Aug. 23, 2016 in Japanese Patent Application No. 2014-218046 (3 pages) with an English Translation (3 pages).

*Primary Examiner* — Brian W Wathen
*Assistant Examiner* — Brian T McMenemy
(74) *Attorney, Agent, or Firm* — Drinker Biddle & Reath LLP

(57) ABSTRACT

A numerical controller adapted to perform an operation based on table-format data includes a table management unit that selects a plurality of tables of table-format data used for a machining operation, a distribution processing unit that generates, for each table of the table-format data, distributed interpolation data for an axis to be controlled on the basis of the table-format data according to the plurality of tables of table-format data read out by the table readout unit, and a selection and superimposition unit that selects and superimposes, for each control axis, the plurality of tables of distributed interpolation data generated by the distribution processing unit.

4 Claims, 10 Drawing Sheets

(56) References Cited

U.S. PATENT DOCUMENTS

| | | | | |
|---|---|---|---|---|
| 5,578,913 | A * | 11/1996 | Yasuda | G05B 19/408 318/567 |
| 7,548,795 | B2 * | 6/2009 | Sagasaki | G05B 19/4155 318/569 |
| 2002/0158597 | A1 | 10/2002 | Endo et al. | |
| 2003/0191553 | A1 | 10/2003 | Isohata | |
| 2006/0255759 | A1 | 11/2006 | Takeuchi et al. | |
| 2009/0248194 | A1 * | 10/2009 | Lammering | G05B 19/4163 700/173 |
| 2011/0196527 | A1 * | 8/2011 | De Lille | B23D 47/04 700/103 |
| 2012/0283879 | A1 | 11/2012 | Takeuchi et al. | |

FOREIGN PATENT DOCUMENTS

| | | |
|---|---|---|
| JP | 2001-170843 A | 6/2001 |
| JP | 2003-303005 A | 10/2003 |
| JP | 2006-289583 A | 10/2006 |
| JP | 2006-302171 A | 11/2006 |
| JP | 2012-234445 A | 11/2012 |

* cited by examiner

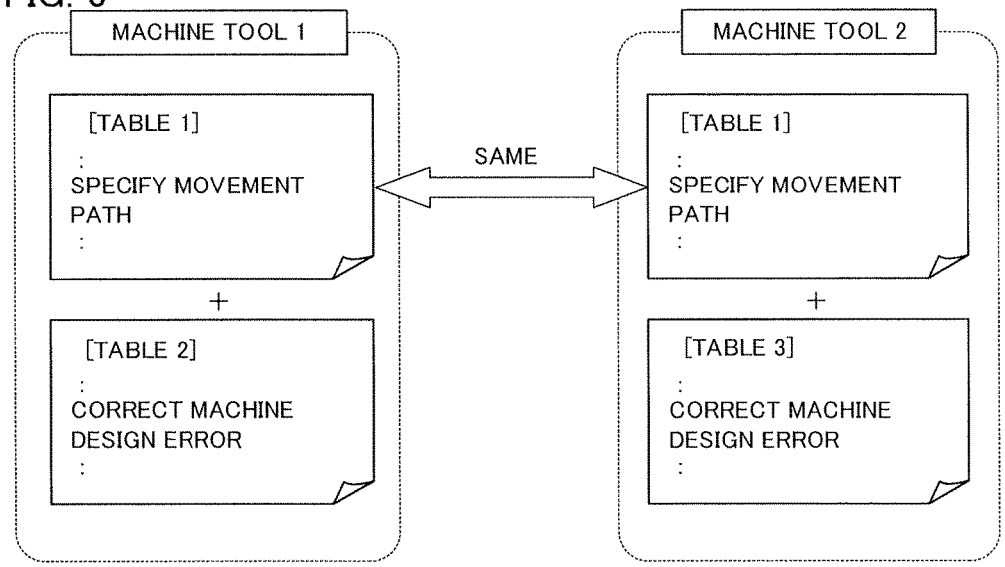
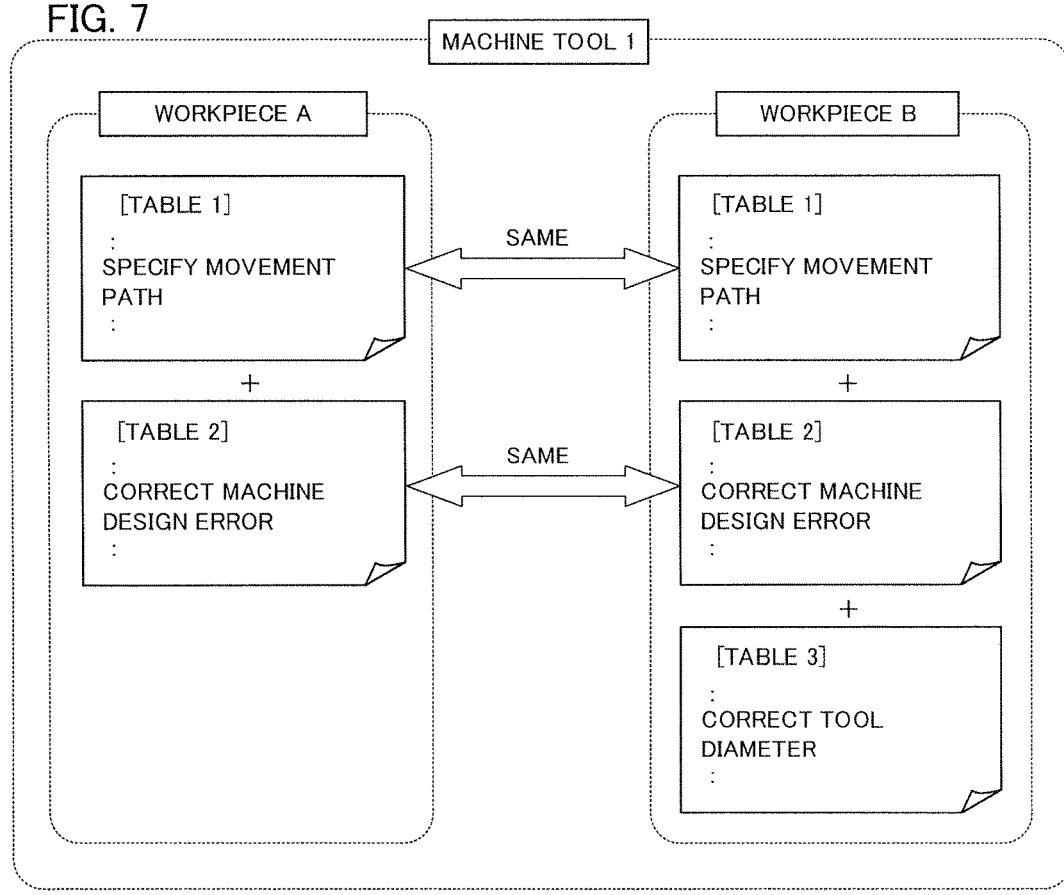

NUMERICAL CONTROLLER OPERATING FROM TABLE-FORMAT DATA

RELATED APPLICATION DATA

This application claims the priority under 35 U.S.C. § 119 and/or § 365 to Japanese Application No. 2014-218046 filed Oct. 27, 2014, the entire contents is incorporated herein by reference.

BACKGROUND OF THE INVENTION

Field of the Invention

The present invention relates to a numerical controller adapted to perform an operation based on table-format data, and more particularly to a numerical controller adapted to perform an operation based on table-format data by superimposing a plurality of tables of table-format data.

Description of the Related Art

There has been widely known an operation function on the basis of table-format data in a drive control method whereby to drive each control axis in synchronization with the motion of a reference axis. According to the method, the position information on each control axis in relation to the position of the reference axis is stored as table-format data provided in a memory or the like, and each control axis is operated in synchronization with the reference axis on the basis of the information stored as the table-format data.

In the operation function based on the table-format data, the table-format data that sets an axis position or auxiliary function such as an M code, corresponding to time, an axis position, an spindle position is stored beforehand in a memory or a storage device connected through a network, and the table-format data is read out in sequence to control each axis and the auxiliary function.

Japanese Patent Application Laid-Open No. 59-177604 and Japanese Patent Application Laid-Open No. 2003-303005 describe a path table operation function utilizing the operation function based on the foregoing table-format data, or a numerical controller referred to as electronic cam control. These technologies permit free tool operations not restricted by machining programs, making it possible to achieve reduced machining time and higher machining accuracy.

Further, an applied technology of the operation function based on the table-format data is described in Japanese Patent Application Laid-Open No. 2006-289583. According to the technology, in a cycle operation, such as a thread cutting operation, an operation of cutting in by a predetermined amount and a machining cycle operation, which has the same machining pattern, are separated, and two tables of table-format data, namely, the table-format data for directing the cutting in operation and the table-format data for directing the machining cycle operation, are stored. Further, the movement amount for the cutting in operation specified by the table-format data thereof and the movement amount for the machining cycle operation specified by the table-format data thereof are calculated and superimposed to drive each control axis. FIG. 12 illustrates an example in which the cycle table data for directing the machining cycle operation is read from the main table data for directing the cutting in operation to carry out a simultaneous operation.

According to the foregoing technology, in a cutting cycle that repeats the same machining cycle operation while carrying out the cutting in operation, two tables of table-format data are used to drive a single control axis, making it possible to superimpose the cutting in operation and the same machining cycle operation, as illustrated in FIG. 13.

However, the application of the technology described in Japanese Patent Application Laid-Open No. 2006-289583 is limited to the same machining cycle. The technology permits the simultaneous use of the table-format data for the cutting in operation and the table-format data for the machining cycle operation and allows the movement amounts in the individual operations to be superimposed. However, the technology allows only one table of table-format data to be used for one control axis in machining processes except for the machining cycle. FIG. 14 is a diagram illustrating the relationship between main table processing and cycle table processing. As illustrated, according to the prior art, it is required to call up a cycle table for a cycle operation from a main table for performing a cutting in operation, and the cycle table is used as a subordinate to the main table.

Hence, the axes and the spindle that are not involved in the cutting in operation and the machining cycle operation, an auxiliary function are controlled according to one table of table-format data. The axis movement paths, correction amounts and the like for the axes or the spindle are all described in one table of table-format data. In the case where a correction amount is required to be revised due to, for example, a difference in each machine or deterioration with age, there has been a problem in that a movement amount corresponding to the correction amount must be extracted from coordinate values described in one table of table-format data in order to make the revision.

Further, in the operation using the conventional table-format data, only one type of reference values can be specified in one table of table-format data, so that one reference value is selected from among a time reference, an axis position reference, and a spindle position reference to prepare the table-format data. Hence, in the case where a command involving two or more reference values is desired to be executed, e.g. in the case where an auxiliary function is desired to be output according to time, the position of an axis and the position of a spindle, there has been a problem in that, if the table-format data based on time is selected, then the position of the axis and the position of the spindle axis must be converted into the reference time to create the table-format data.

SUMMARY OF THE INVENTION

Accordingly, an object of the present invention is to provide a numerical controller that simultaneously handles a plurality of tables of table-format data for a single axis, a spindle or an auxiliary function regardless of a machining process.

A numerical controller adapted to perform an operation based on table-format data in accordance with the present invention uses table-format data that designates the position of each control axis or an auxiliary function on the basis of a time, the position of an axis, or the position of a spindle thereby to control the position of a control axis or an auxiliary function in synchronization with the time, the position of an axis, or the position of the spindle, which provide references. The numerical controller performing an operation based on table-format data includes: a table management unit that selects a plurality of tables of table-format data used for a machining operation; a table readout unit that reads out the plurality of tables of table-format data selected by the table management unit; a distribution processing unit that generates, for each of the tables of table-format data, distributed interpolation data for an axis to be controlled on the basis of the table-format data according to the plurality of tables of table-format data read out by the table readout unit; a selection and superimposition unit that selects and superimposes, for each control axis, the plurality of tables of distributed interpolation data generated by the distribution processing unit; and a motor control unit that controls the position of the control axis on the basis of the superimposed distributed interpolation data.

At least one of the plurality of tables of table-format data may have a different type of reference specified, and the distribution processing unit may be adapted to receive the plurality of tables of table-format data and to generate distributed interpolation data according to a reference specified by each table of table-format data.

The numerical controller performing an operation based on table-format data may further include an auxiliary function control unit that analyzes a plurality of tables of table-format data that designates an auxiliary function and notifies an auxiliary function designated according to a reference designated by each table of table-format data; and an auxiliary function output unit that outputs the auxiliary function notified from the auxiliary function control unit to an external device.

The present invention configured as described above makes it possible to specify a movement path, a correction amount and the like in separate tables of table-format data for an axis or a spindle and to select table-format data to be used so as to superimpose movement amounts. Further, table-format data based on a time, the position of an axis, and the position of a spindle can be simultaneously handled, not being limited to a single reference value.

BRIEF DESCRIPTION OF THE DRAWINGS

The above and other objects and features of the present invention will be obvious from the ensuing description of embodiments with reference to the accompanying drawings, in which:

FIG. 6 is a diagram illustrating an example of the table-format data used for machining identical workpieces by different machine tools according to the embodiment of the present invention;

FIG. 7 is a diagram illustrating an example in which tool diameter correction table-format data is added after a tool change according to the embodiment of the present invention;

DETAILED DESCRIPTION OF THE PREFERRED EMBODIMENTS

First, the basic general description will be given of the operation of superimposing a plurality of table-format data in accordance with the present invention.

The present invention provides a technology for simultaneously handling a plurality of tables of table-format data for a single axis, a spindle, or an auxiliary function independently of machining conditions. There is no subordinate relationship represented by a main table and a cycle table, and each table of table-format data can be independently handled.

Figure 1:
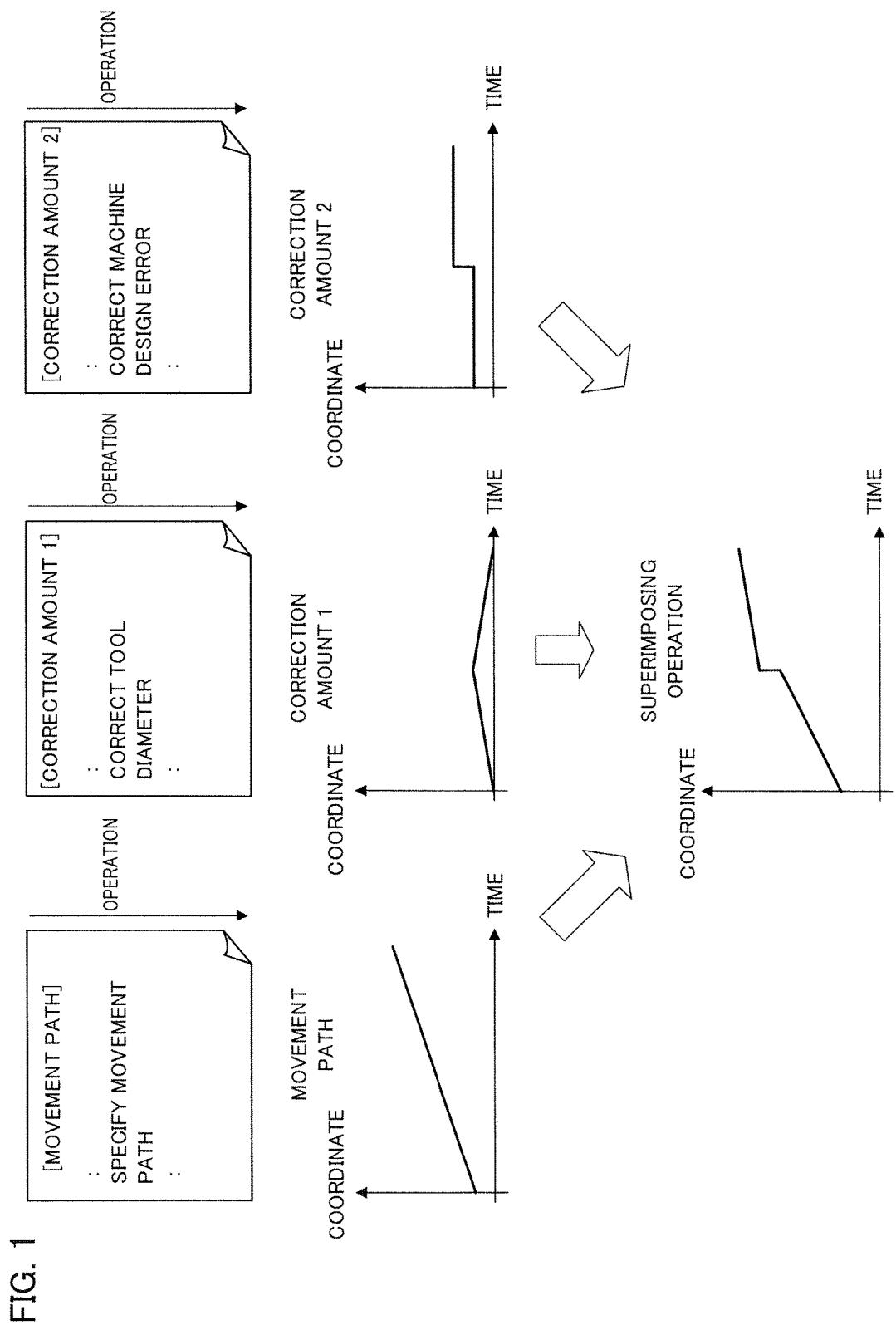
FIG. 1 is a diagram illustrating the outline of the processing of superimposing a plurality of tables of table-format data according to the present invention.

For example, as illustrated in FIG. 1, the present invention makes it possible to create the data of a movement path, correction amount 1 and correction amount 2 by using separate table-format data and to use the created separate table-format data at the same time. Thus, the movement amounts of the three different tables of table-format data can be superimposed for a single axis, thereby making it possible to achieve an operation illustrated by the chart given at the bottom in FIG. 1.

The present invention has no dependency relationship among tables as observed in prior arts, and independently uses each table of table-format data. The present invention does not have an established arrangement between a main table and a cycle table, which applies to the cycle machining according to prior arts, thus obviating the need for a call or an end instruction from a main table. Further, two or more tables of table-format data can be simultaneously used for a single axis, a spindle or an auxiliary function.

As with prior arts, the present invention uses the same reference value counter that is initialized at the start of handling table-format data to accomplish synchronization among a plurality of tables of table-format data to be used for a single axis, a spindle, or an auxiliary function. With the selectable references including a time reference, an axis position reference and a spindle position reference, an operation synchronized with the time, the axis position or the spindle position is achieved. FIG. 1 illustrates an example of the operation synchronized with time.

Figure 2:
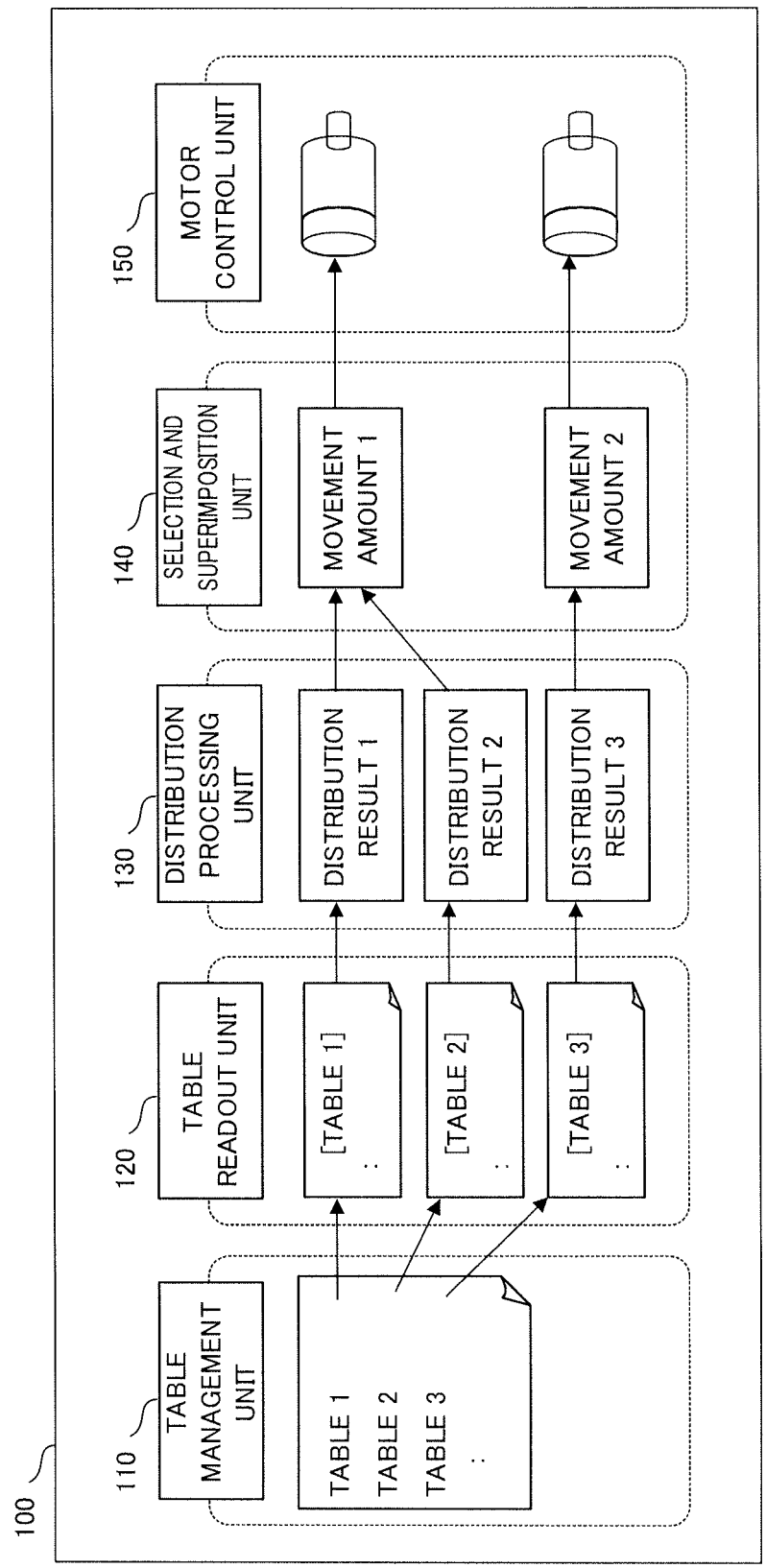
FIG. 2 is a block diagram illustrating the essential sections of a numerical controller according to an embodiment of the present invention.

FIG. 2 is a block diagram illustrating the essential sections of a numerical controller according to an embodiment of the present invention. A numerical controller 100 has a table management unit 110, a table readout unit 120, a distribution processing unit 130, a selection and superimposition unit 140, and a motor control unit 150.

The table management unit 110 manages a plurality of tables of table-format data stored in a memory (not illustrated) or a storage device (not illustrated) or the like, selects table-format data to be used for a machining operation and notifies the table readout unit 120 of the selected table-format data.

The table readout unit 120 reads the plurality of tables of table-format data notified from the table management unit 110 out from the memory or the storage device and supplies the table-format data to the distribution processing unit 130.

The distribution processing unit 130 receives the plurality of tables of table-format data supplied from the table readout unit 120, distributes the movement amount specified by each table of the table-format data to a movement amount to be directed to each shaft movable part for each distribution cycle, and stores the distribution results. Further, the distribution processing unit 130 sets the selection conditions and superimposition conditions of the distribution results for each axis and notifies the selection and superimposition unit 140.

The selection and superimposition unit 140 selects and superimposes the distribution results notified from the distribution processing unit 130 for each drive shaft of a motor or the like to be driven, and notifies the motor control unit 150.

The motor control unit 150 drives the motor according to the movement amounts notified from the selection and superimposition unit 140.

Figure 3:
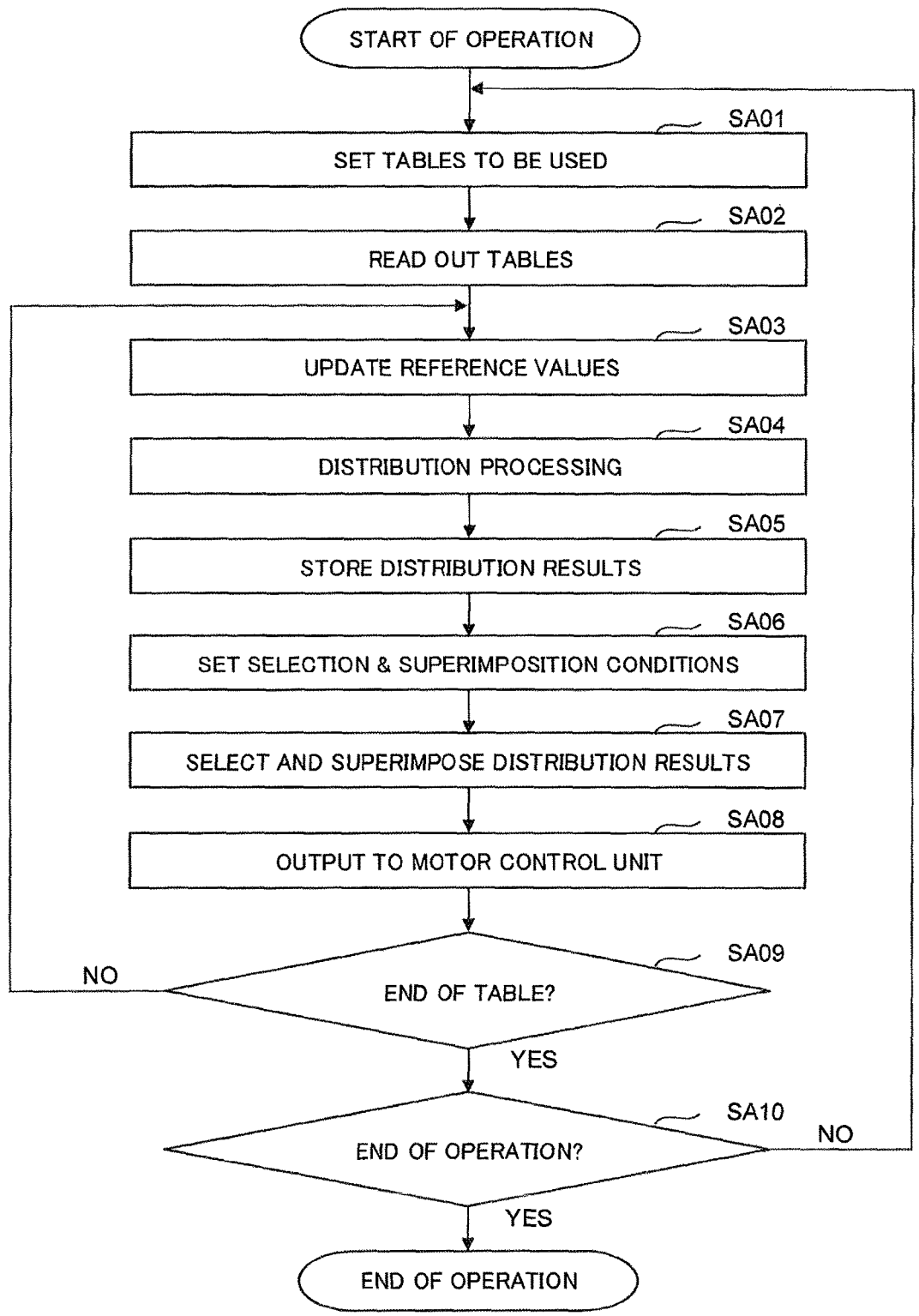
FIG. 3 is a schematic flowchart of the processing carried out on the numerical controller according to the embodiment of the present invention.

FIG. 3 is a schematic flowchart of the processing carried out on the numerical controller 100 in the embodiment of the present invention.

[Step SA01] Upon a start of a machining operation, the table management unit 110 selects a plurality of tables of table-format data to be used for a machining operation from among the plurality of tables of table-format data under management, and notifies the table readout unit 120 of the identification information of the table-format data.

[Step SA02] The table readout unit 120 sequentially reads out the plurality of tables of table-format data from the memory or the storage device on the basis of the identification information on the table-format data notified from the table management unit 110.

[Step SA03] The distribution processing unit 130 receives the plurality of tables of table-format data output by the table readout unit 120 and updates the reference values of the distribution processing according to the references, such as the time reference, the axis position reference, and the spindle position reference, used in each table of table-format data.

[Step SA04] The distribution processing unit 130 distributes the movement amount specified in each table of the table-format data to the movement amount to be directed to each shaft movable part for each distribution cycle on the basis of the reference values updated in step SA03. The distribution processing is carried out for each table of table-format data.

[Step SA05] The results obtained by the distribution processing in step SA04 are stored by each table of table-format data.

[Step SA06] On the plurality of distribution results stored in step SA05, the selection conditions and the superimposition conditions are set so as to specify which distribution results are to be supplied to which motors and which distribution results are to be superimposed.

[Step SA07] The selection and superimposition unit 140 selects the output destinations of the plurality of the stored distribution results and carries out superimposition according to the selection conditions and the superimposition conditions, respectively, which are set in step SA06, and calculates the distribution movement amount of each motor.

[Step SA08] The motor control unit 150 drives each motor on the basis of the distribution movement amounts calculated in step SA07.

[Step SA09] It is determined whether the end of the table-format data has been reached. If it is determined that the end has been reached, then the procedure proceeds to step SA10. If it is determined that there is still remaining data, then the procedure returns to step SA03.

[Step SA10] It is determined whether the machining operation is ended. If it is determined that the machining operation has ended, then the procedure terminates the processing. If it is determined that the machining operation is not yet ended, then the procedure returns to step SA01.

The numerical controller 100 described with reference to FIG. 2 and FIG. 3 is capable of achieving the synchronization among a plurality of tables of table-format data used for a single axis or the spindle. The present invention makes it possible to also achieve the synchronization among a plurality of table-format data used for an auxiliary function in addition to a single axis or the spindle.

Figure 4:
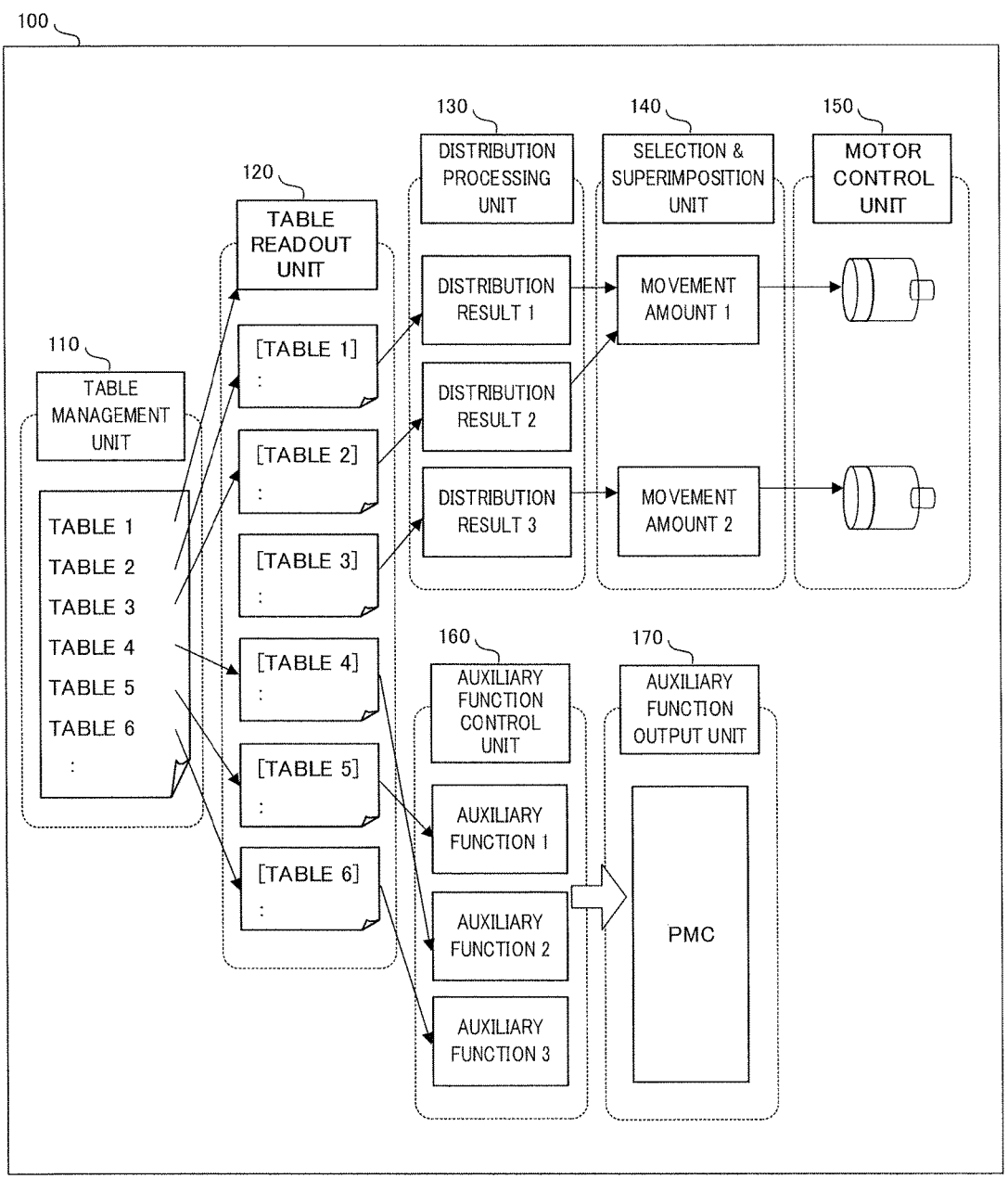
FIG. 4 is a block diagram illustrating the essential sections of a numerical controller handling an auxiliary function table according to another embodiment of the present invention.

FIG. 4 is a block diagram illustrating the essential sections of a numerical controller handling an auxiliary function table according to another embodiment of the present invention. The numerical controller includes an auxiliary function control unit 160 and an auxiliary function output unit 170 in addition to the foregoing distribution processing unit 130, the foregoing selection and superimposition unit 140 and the foregoing motor control unit 150.

The auxiliary function control unit 160 receives a plurality of tables of table-format data output by the table readout unit 120, and updates the reference values for determining the outputs of the auxiliary function according to the references, namely, the time reference, the axis position reference, and the spindle position reference, used in each table of table-format data. When an updated reference value reaches the reference value specified in the table-format data, the auxiliary function to be output is extracted and notified to the auxiliary function output unit 170. The auxiliary function output unit 170 outputs the auxiliary function notified from the auxiliary function control unit 160 to a programmable machine controller (hereinafter referred to as "the PMC").

The block diagram illustrates an example in which an auxiliary function for signal control is supplied to the PMC. The technology also makes it possible to output a comment sentence specified in the table-format data to a display unit as an auxiliary function.

Figure 5:
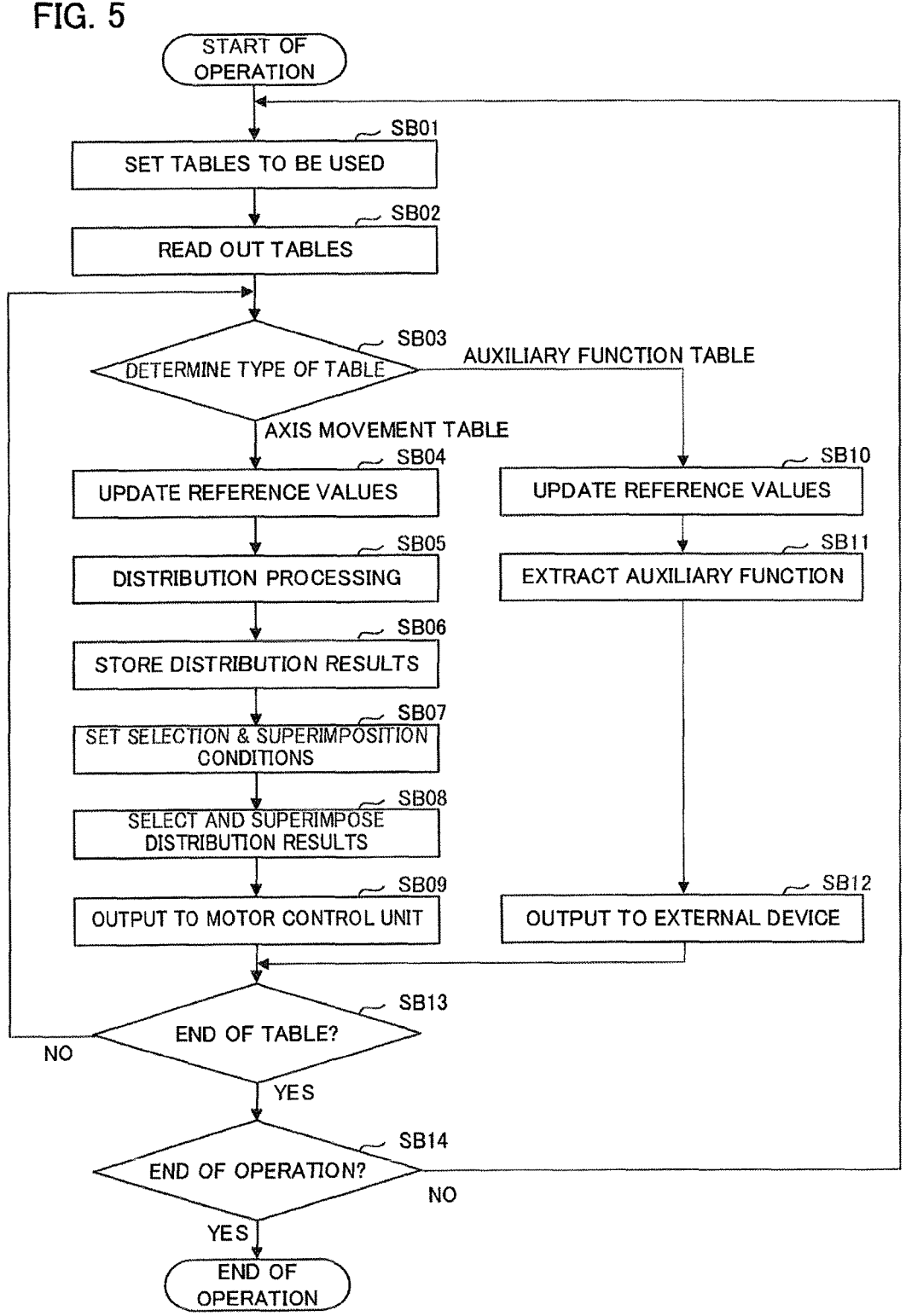
FIG. 5 is a schematic flowchart of the processing carried out on the numerical controller handling the auxiliary function table according to the embodiment of the present invention.

FIG. 5 is a schematic flowchart of the processing carried out on a numerical controller 100, which handles an auxiliary function table according to another embodiment of the present invention.

[Step SB01] Upon a start of a machining operation, a table management unit 110 selects a plurality of tables of table-format data to be used for the machining operation from among a plurality of tables of table-format data under the management thereby, and notifies a table readout unit 120 of the identification information of the table-format data.

[Step SB02] The table readout unit 120 sequentially reads out each table of table-format data from a memory or a storage device according to the identification information of the plurality of tables of table-format data notified from the table management unit 110.

[Step SB03] The table readout unit 120 determines the types of the tables that have been read out. If the table-format data that has been read out is the table-format data for controlling an axis, then the procedure proceeds to step SB04, or if the table-format data is for controlling an auxiliary function, then the procedure proceeds to step SB10.

[Step SB04] A distribution processing unit 130 receives the plurality of tables of table-format data output by the table readout unit 120 and updates the reference values for the distribution processing according to the references, such as a time reference, an axis position reference, and a spindle position reference used in each table of the table-format data.

[Step SB05] The distribution processing unit 130 distributes the movement amount specified by each table of table-format data to the movement amount to be directed to each shaft movable part for each distribution cycle on the basis of the reference values updated in step SB04. The distribution processing is carried out for each table of table-format data.

[Step SB06] The results obtained by the distribution processing in step SB05 are stored by each table of table-format data.

[Step SB07] On the plurality of distribution results stored in step SB06, the selection conditions and the superimposition conditions are set so as to specify which distribution results are to be supplied to which motors and which distribution results are to be superimposed.

[Step SB08] A selection and superimposition unit 140 selects the output destinations of the plurality of the stored distribution results and performs superimposition according to the selection conditions and the superimposition conditions set in step SB07, and calculates the distribution movement amount of each motor.

[Step SB09] A motor control unit 150 drives each motor on the basis of the distribution movement amount calculated in step SB08.

[Step SB10] An auxiliary function control unit 160 updates the reference values for determining the outputs of auxiliary functions according to the references, namely, the time reference, the axis position reference, and the spindle position reference, used in each table of table-format data.

[Step SB11] If an updated reference value reaches a reference value specified in the table-format data, then an auxiliary function to be output is extracted and notified to an auxiliary function output unit 170.

[Step SB12] The auxiliary function output unit 170 outputs the auxiliary function notified from the auxiliary function control unit 160 to an external device.

[Step SB13] It is determined whether the end of the table-format data has been reached. If it is determined that the end has been reached, then the procedure proceeds to step SB14. If it is determined that there is still remaining data, then the procedure returns to step SB03.

[Step SB14] It is determined whether the machining operation is ended. If it is determined that the machining operation has ended, then the procedure terminates the processing. If it is determined that the machining operation is not yet ended, then the procedure returns to step SB01.

The following will describe an example of a machining operation using a plurality of tables of table-format data in the numerical controller 100 according to the present embodiment.

<Example Using Table-format Data for Correction>

In general, two machine tools adapted to machine identical components may have different machining accuracies due to a difference in each machine. As a solution, the numerical controller 100 according to the present embodiment can be used to share the table-format data for controlling the basic movement paths of tools of the machining operation and to create, for each machine tool, the table-format data for controlling the correction amounts. The table-format data for controlling the tool movement paths does not have to be changed, so that the table-format data can be easily revised, thus permitting a quicker setup.

FIG. 6 illustrates the examples of table-format data used for machining identical workpieces by different machine tools, namely, machine tool 1 and machine tool 2. Both machine tool 1 and machine tool 2 are to machine the identical workpieces, so that they share table 1, which provides the same table-format data for controlling the basic tool movement path. The correction amounts required due to the difference between machine tool 1 and machine tool 2 are described in table 2 for machine tool 1 and in table 3 for machine tool 2. This obviates the need for revising table 1 for controlling the tool movement paths, and only table 2 and table 3, which describe the correction amounts, need to be revised, thus making it easier to revise the table-format data.

Further, in the same machine tool, the table-format data for controlling correction amounts can be selected and superimposed according to the material of a workpiece to be machined, the conditions of tools and machining conditions. This makes it possible to directly use the tool movement paths and the correction amounts based on machine design errors.

FIG. 7 illustrates an example in which a tool diameter correction is added when a workpiece is changed and a different tool is therefore selected. Even after the tool is changed, the tool movement path and the amount of correction based on a machine design error remain unchanged, so that the same table 1 and table 2 are used. Machining a workpiece B requires merely adding table 3 for controlling the correction amount of the tool diameter based on the selected tool. Thus, there is no need for creating table-format data for each workpiece to be machined, and only the addition of a table-format data for controlling the correction amount according to a selected tool is required. This makes it possible to reduce a table capacity.

To revise table-format data by a personal computer (hereinafter referred to as "the PC") connected to a numerical controller in an operation using conventional table-format data, table-format data including a movement path and a correction amount have been transferred even for partly revising a correction amount. Hence, there have been shortcomings of a large transfer capacity and a prolonged transfer time. The numerical controller 100 according to the present embodiment requires merely the transfer of necessary correction table-format data for a correction amount that needs to be revised, thus effectively reducing the transfer time.

Figure 8:
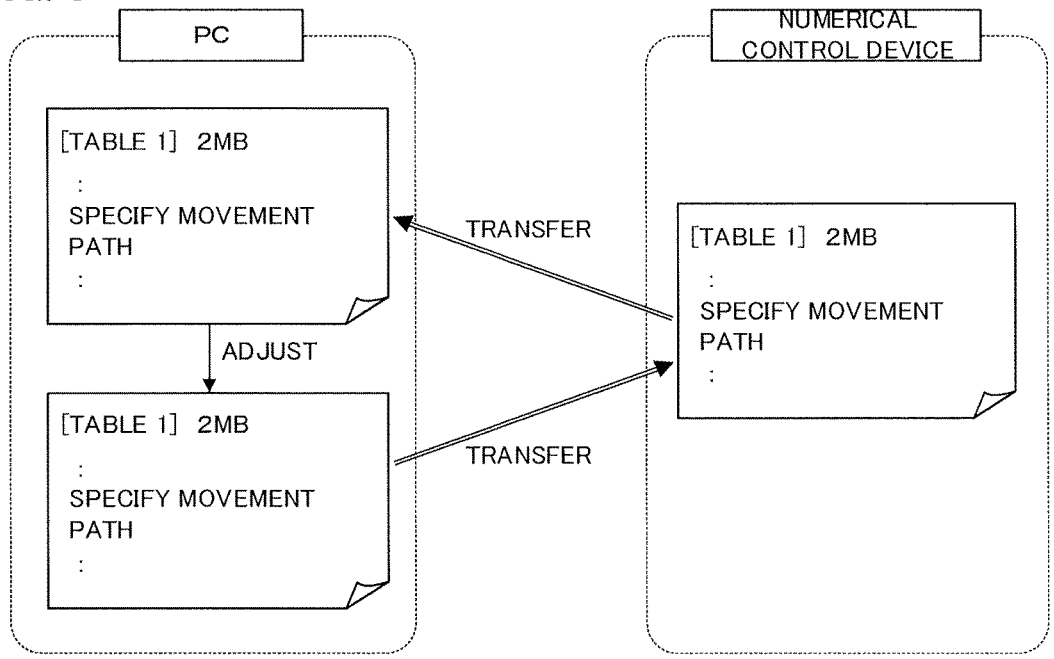
FIG. 8 illustrates an example in which table-format data is revised using a personal computer according to a prior art.

FIG. 8 illustrates a conventional example in which a PC and a numerical controller are connected to revise table-format data through the PC. Table 1 stored in the numerical controller is transferred to the PC so as to revise table 1, and the adjusted table 1 is transferred back to the numerical controller. At this time, according to a prior art, in which a movement path, a correction amount and the like are described in a single table of table-format data, the volume of data to be transferred is equivalent to the size of table 1 (2 MB in the illustrated example) even for revising a correction amount.

Figure 9:
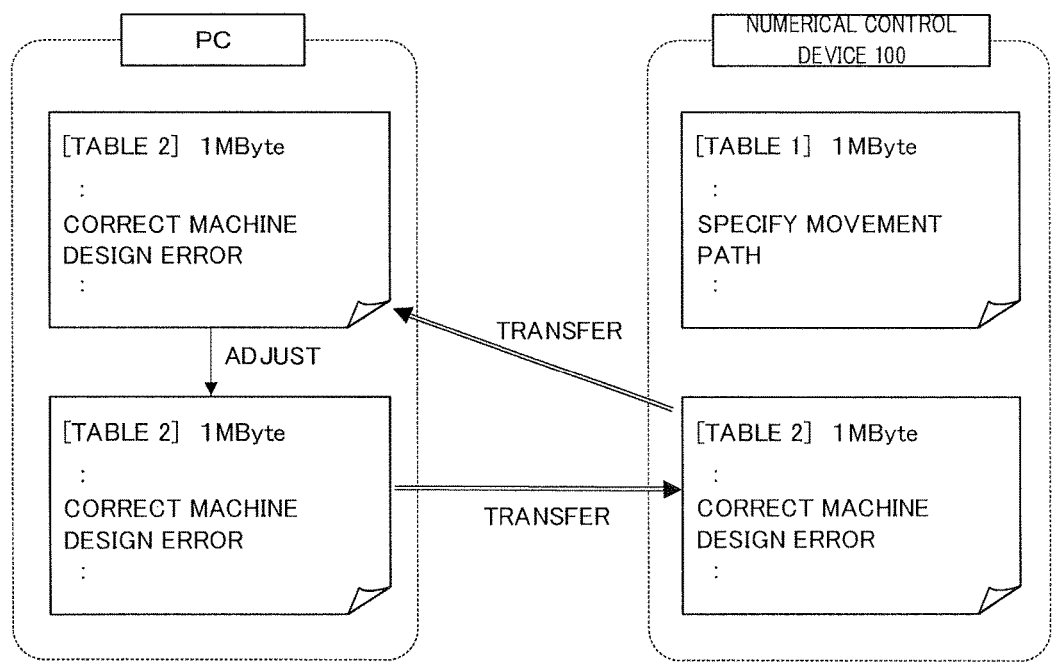
FIG. 9 illustrates an example in which table-format data is revised using a personal computer according to an embodiment of the present invention.

By contrast, according to the technology described in the present invention, the revision of a correction amount requires the transfer of only the table of table-format data of interest, so that the volume of the data to be transferred is equivalent to the size of table 2 (1 MB), as illustrated in FIG. 9. This demonstrates that the volume of data to be transferred is reduced, allowing a table-format data to be efficiently revised.

<Example of Table-format Data Using Different Reference Values>

The numerical controller 100 according to the present embodiment is capable of handling a plurality of tables of table-format data for a single axis, a spindle or an auxiliary function, thus making it possible to create table-format data using different reference values.

The following will describe an example in which M codes are output by an auxiliary function according to time, an axis position and a spindle position. In the operation using the conventional table-format data, only one table of table-format data can be handled, so that if a table of table-format data based on time is selected, then the axis position and the spindle position must be converted to reference times.

Figure 10:
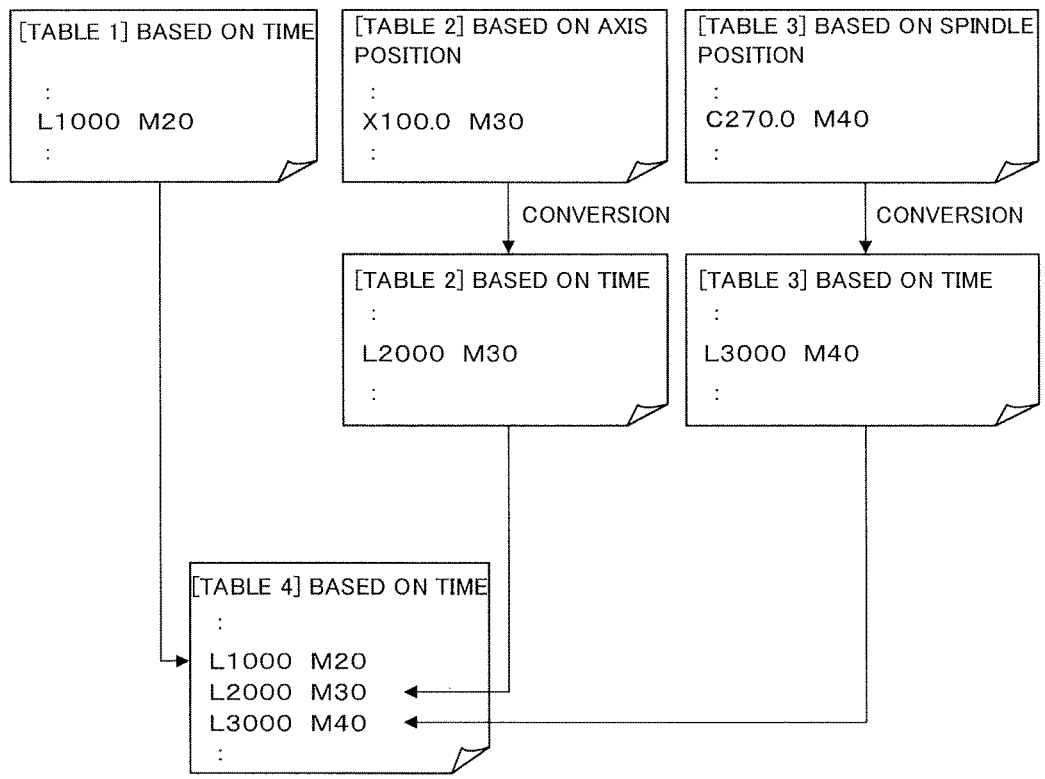
FIG. 10 illustrates an example in which a plurality of tables of table-format data using different references is converted into a single table of table-format data according to a prior art.

As illustrated in FIG. 10, M20 is output at a reference time of L1000 from the operation start of table-format data, and an M code, namely, M30, is output when an X-axis reaches a coordinate value 100.0 and an M code, namely, M40, is output when the spindle reaches a coordinate value 270.0. If a table of table-format data based on time is selected, then an operator has to calculate the time for the X-axis to reach the coordinate value 100.0 (L2000 in FIG. 10) and the time for the spindle to reach the coordinate value 270.0 (L3000 in FIG. 10), and add the calculated results to the table of table-format data based on time.

Figure 11:
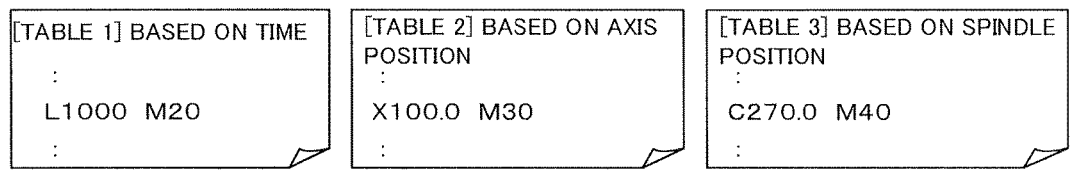
FIG. 11 illustrates an example in which a plurality of tables of table-format data based on different references is used according to an embodiment of the present invention.
Figure 12:
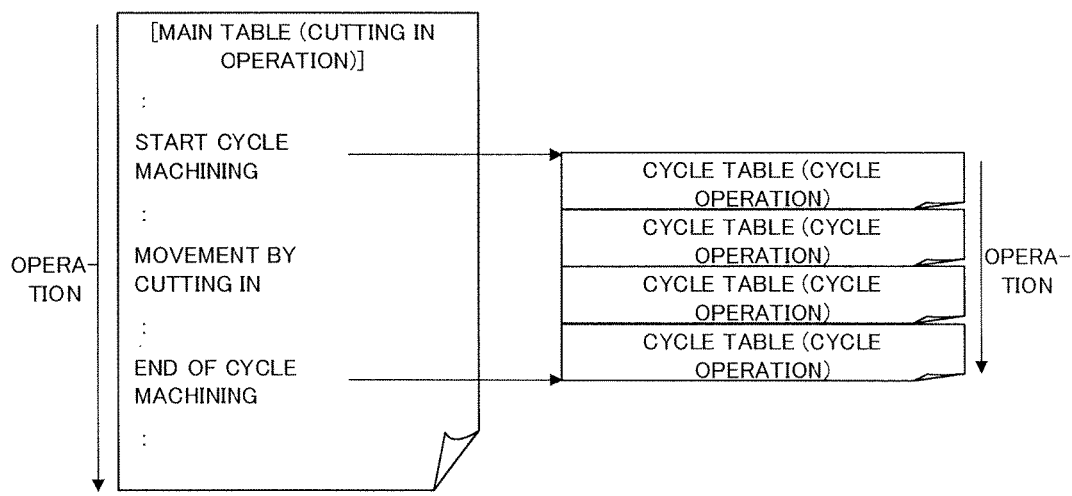
FIG. 12 is a schematic diagram illustrating a cycle machining operation based on table-format data according to a prior art.
Figure 13:
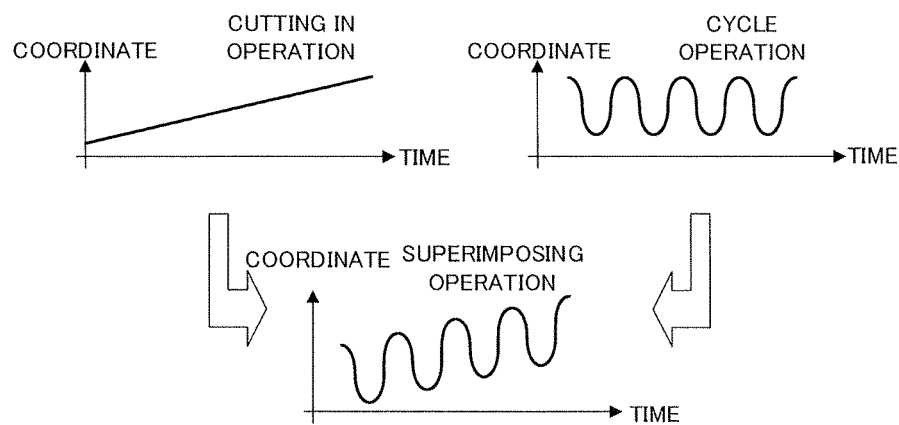
FIG. 13 illustrates an example of a superimposing operation based on table-format data according to a prior art.
Figure 14:
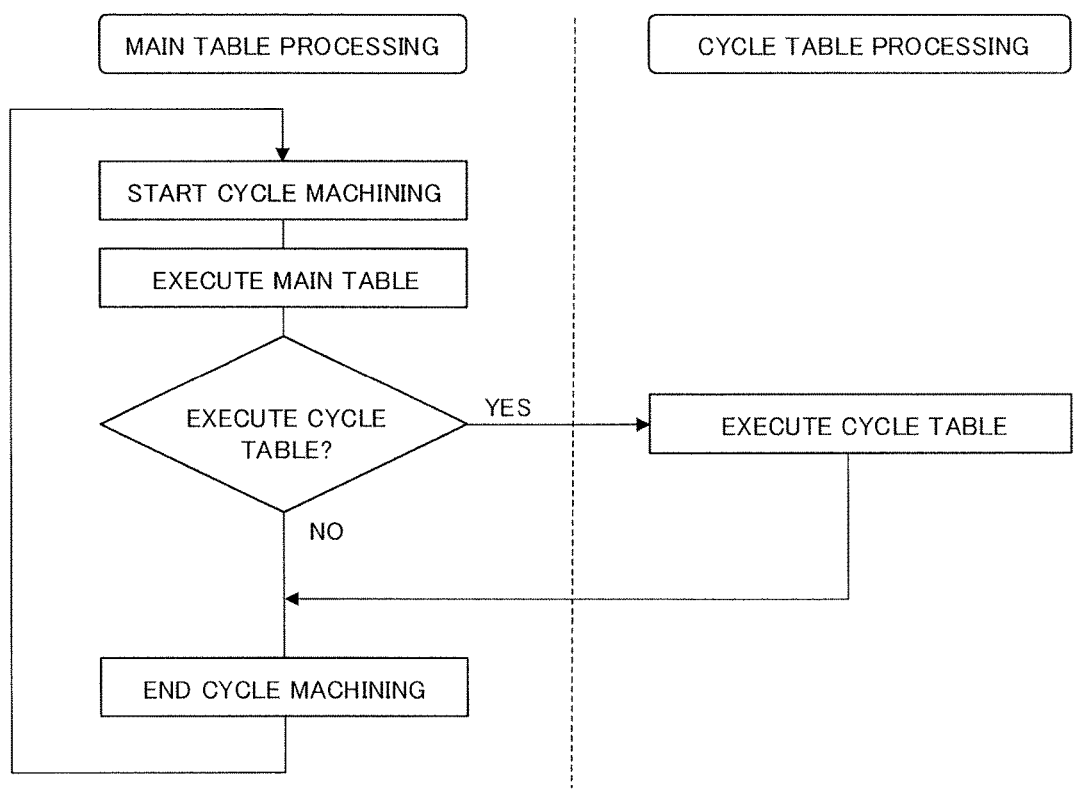
FIG. 14 is a diagram illustrating the relationship between main table processing and cycle table processing according to the prior art.

By contrast, according to the embodiments of the present invention, an operator is not limited to one reference value when preparing individual tables of table-format data, and will be enabled to select the time reference, the axis position reference and the spindle position reference of the three tables of table-format data illustrated in FIG. 11, thus permitting easier creation of table-format data.

The invention claimed is:

1. A numerical controller that performs a machining operation on a workpiece by controlling a drive motor of a machine tool based on table-format data, the numerical controller comprising:
   a table management unit that selects a plurality of tables of table-format data to be used for the machining operation;
   a table readout unit that sequentially reads out the selected plurality of tables of table-format data;
   a distribution processing unit that
      updates one or more reference values specified by each of the tables of table-format data, the one or more reference values including one or more of (i) a period of time, (ii) a position of an axis of the machine tool, and (iii) a position of a spindle of the machine tool,
      generates, for each of the tables of table-format data, distributed interpolation data for controlling a corresponding control axis of the machine tool on the basis of the updated one or more reference values specified by the respective tables of table-format data, and
      sets selection and superimposition conditions for the distributed interpolation data generated for the tables of table-format data, the selection and superimposition conditions specifying, for each table of table-format data, whether the corresponding distributed interpolation data is to be superimposed with distributed interpolation data corresponding one or more other tables of table-format data;
   a selection and superimposition unit that selects and superimposes, for each control axis of the machine tool, the distributed interpolation data generated by the distribution processing unit based on the selection and superimposition conditions; and
   a motor control unit that controls a position of each control axis of the machine tool on the basis of the superimposed distributed interpolation data.

2. The numerical controller according to claim 1, wherein each of the plurality of tables of table-format data specifies a different type of reference value, and
   the distribution processing unit receives the plurality of tables of table-format data and generates the distributed interpolation data according to the type of reference value specified by each table of table-format data.

3. The numerical controller according to claim 1, further comprising:
   an auxiliary function control unit that determines whether the updated one or more reference values specified by each table of table-format data satisfies a predetermined reference value threshold; and
   an auxiliary function output unit that outputs an auxiliary function to an external device when the auxiliary function control unit determines that at least one of the updated reference values satisfies the predetermined reference value threshold.

4. The numerical controller according to claim 2, further comprising:
   an auxiliary function control unit that determines whether the updated one or more reference values specified each table of table-format data satisfies a predetermined reference value threshold; and
   an auxiliary function output unit that outputs an auxiliary function to an external device when the auxiliary function control unit determines that at least one of the updated reference values satisfies the predetermined reference value threshold.

* * * * *